2 Sheets—Sheet 1.

J. W. CARVER.
Tacking-Machine.

No. 207,851. Patented Sept. 10, 1878.

WITNESSES.
F. F. Raymond 2d
George F. Walker

INVENTOR.
Jos. W. Carver

2 Sheets—Sheet 2.

J. W. CARVER.
Tacking-Machine.

No. 207,851. Patented Sept. 10, 1878.

WITNESSES.
G. F. Raymond 2d
Geo. F. Walker

INVENTOR.
Jas. W. Carver

N. PETERS, PHOTO-LITHOGRAPHER, WASHINGTON, D. C.

UNITED STATES PATENT OFFICE.

JAMES W. CARVER, OF LYNN, MASSACHUSETTS.

IMPROVEMENT IN TACKING-MACHINES.

Specification forming part of Letters Patent No. 207,851, dated September 10, 1878; application filed May 31, 1878.

*To all whom it may concern:*

Be it known that I, JAMES W. CARVER, of Lynn, in the county of Essex and Commonwealth of Massachusetts, have invented an Improvement in Tacking-Machines, of which the following is a specification:

This invention relates to that class of tacking devices in which tacks are fed from a hopper or chamber to the driver through an inclined chute; and consists in the hereinafter-described mechanism for feeding the tacks from the hopper to the chute, and for delivering the tacks to a position underneath the driver by means of an index-feeder.

Figure 1:
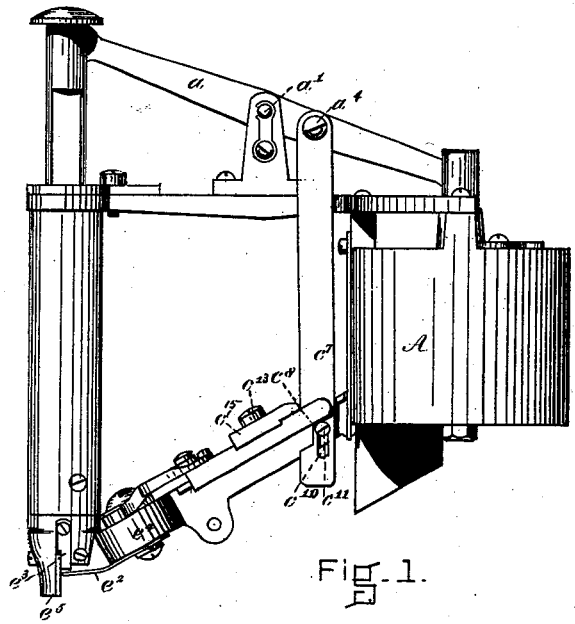
Figure 2:
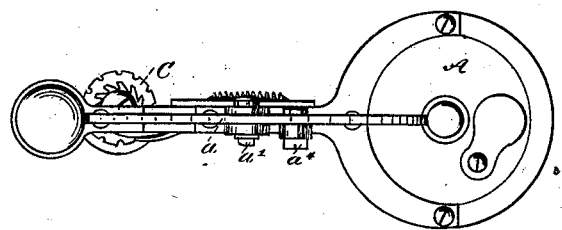
Figure 3:
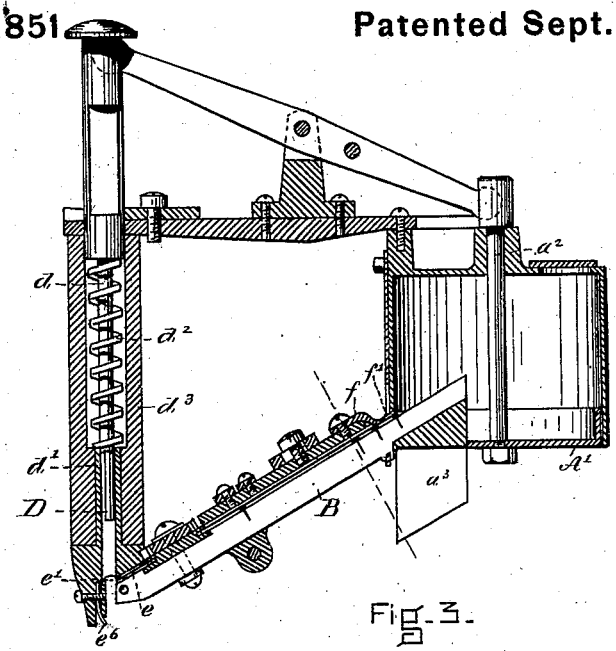
Figure 4:
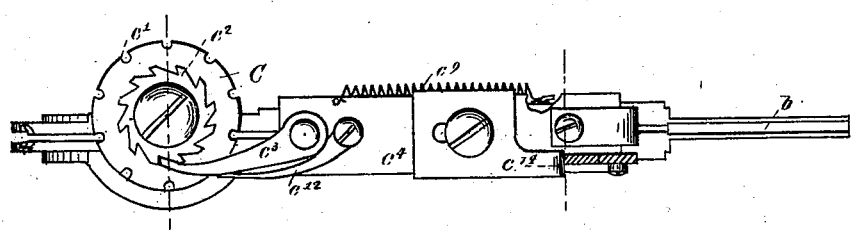
Figure 5:
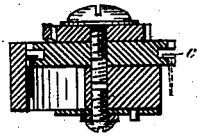
Figure 6:
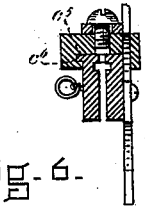

In the drawings, Figure 1 is a side elevation of the complete tacking device. Fig. 2 is a plan of the same. Fig. 3 is a vertical central section of the machine. Fig. 4 is a plan of the raceway and mechanism for operating the index. Figs. 5 and 6 are detail views.

Heretofore it has been common to feed tacks from a chamber, hopper, or reservoir through an inclined chute to a position from whence they can be driven; but the feeding device consisted in a simple raceway, which received the tacks from the hopper, and deposited them at its end underneath the driver without the assistance of any intermediary regulating or independent feeding device.

I will first describe the device for feeding the tacks from the hopper A to the inclined chute B.

The hopper A is provided with a vertically-moving diaphragm, A′, which is lifted at each stroke of the driver by a lever, $a$, which is pivoted at $a^1$, as shown, is attached to the head of the driver, and is pivoted at its opposite end to the connecting-rod $a^2$.

The inclined chute projects into the hopper or chamber almost to its center, and is provided with the opening of a width sufficient to receive the shank of a tack, but not wide enough to permit the head of the tack to fall therein. The entire width of this portion of the chute $b$, including the opening, must be preferably a little wider than the width of the head of the tack.

Attached to the diaphragm is a clearing device, consisting of the downwardly-projecting portions $a^3$, one upon each side of that portion of the chute within the hopper.

As the diaphragm lifts, the clearing device removes from the chute $b$ all tacks which are not uniformly deposited heads up in the chute, and the object of the moving diaphragm is to shake the tacks, so that in falling a few will enter the chute points down. The tacks are thus fed into the chute or raceway B, and then descend by gravity to the index C. This index is arranged in the lower end of the chute, and consists of a disk provided with a circumferential groove, $c$, and notches $c^1$. The object of this index so constructed is to receive from the chute the descending tacks, and to successively deliver them to a position underneath the driver.

To effect this the index is so timed that when at rest it is always in a position to receive a tack from the chute, which falls from the chute into the lower notch, $c^1$, with its head resting upon the under portion of the groove in said index, so that when the index is at rest the raceway opens into a notch, and permits one tack to fall into position for each tack received by the index, in the manner specified. Another tack upon the opposite side of the index which has been thus received and carried round by the intermittent revolution of the index is deposited or dropped from the notch and groove into a position underneath the driver D. The tack, as it leaves the index, falls into a short inclined guide, $e$, communicating with a chamber, $e^1$, immediately under the driver, dropping from the end of said guides upon the split spring $e^2$, which supports the head of the tack, and allows the shank and point to project downwardly therefrom.

The tack is guided to this position on the split or recessed spring by means of the side springs, $e^3$, which project downwardly and inwardly from the nozzle or mouth of the tacker toward the split or recessed spring. The index C is provided with a ratchet, $c^2$, which has teeth corresponding in number to the number of notches. This ratchet is operated by a pawl, $c^3$, sliding bar $c^4$, which covers the raceway, and is guided thereon by the projections $c^5$ on the raceway, and the groove $c^6$ on the sliding bar $c^4$, and the connecting-bar $c^7$, which is provided with the incline $c^8$, against which the upper end of the slide or of a movable block upon the slide contacts. This slide-bar $c^4$, and the fall which it operates, are kept constantly against this incline by the spring $c^9$, and the downward movement of the connecting-bar $c^7$ causes the incline $c^8$ to operate and move downwardly the pawl $c^3$. This connecting-bar $c^7$ is operated by the walking-beam lever $a$, to which it is pivoted at $a^4$. The other end of this connecting-bar is slotted at $c^{10}$, and the set-screw $c^{11}$ acts as a guide. The pawl $c^3$ is provided with the spring $c^{12}$, which is pivoted to the sliding bar $c^4$, and acts to constantly hold the end of the pawl in the ratchet, in the ordinary way.

The movable block $c^{15}$ is sometimes used to regulate the throw of the pawl, and it is fastened upon the upper side of the slide by a set-screw, $c^{13}$, in such a way that the projecting portion $c^{14}$ shall contact with the incline $c^8$ upon the driving-bar. By moving this block upon the slide the stroke of the pawl is regulated at will, according as it is moved to or from the incline.

The divided spring $e^2$, which receives the tack from the guide $e$ and presents it to the action of the driver, preferably is fastened to the lower portion of the box $e^4$, which partially surrounds the index. Projecting downwardly and outwardly from the nose $e^5$ is a centering-spring, $e^6$, which operates while the tack is being driven, in connection with the forked spring $e$, in centering the tack.

The driver D consists in the rod $d$, which is somewhat cut away, when desirable, upon the front side, $d^1$, and is caused to reciprocate against the action of the spring $d^2$ in the cylinder $d^3$, which also serves as a handle.

In some instances it is desirable to clear the upper portion of the raceway from tacks which may not have lodged therein in a way to feed easily, or which may be imperfect, and for this purpose I provide the slide-bar $c^4$ with an arm, $f$, having a thin projection, $f'$, which plays up and down in the upper part of the raceway or chute, as shown.

In operation, the tacks are fed into the hopper, the driver is moved as in the operation of driving, the diaphragm is lifted, throwing the tack into the upper portion of the chute, and clearing the same from tacks which do not evenly lodge therein points downward. The tacks fall by gravity to the end of the raceway, are picked up one by one by the index, and successively delivered by said index to a position underneath the driver. Each descent of the driver throws back the pawl into a position to feed, and each lift of the driver causes the index to pick a tack from the raceway, and to deliver a tack into the proper position under the driver.

Of course any suitable frame-work for connecting the hopper with the cylinder inclosing the driver may be used, and I need not specify here the particular shape of these connecting portions.

Having thus fully described my invention, I claim and desire to secure by Letters Patent of the United States—

1. In a tacking device, the combination of a stationary hopper or cylinder, for receiving the tacks in bulk, with a movable diaphragm adapted to be intermittingly reciprocated vertically, for the purpose of depositing tacks in the feed-chute leading from said hopper or cylinder, substantially as shown and described.

2. In a machine for feeding tacks to a raceway or inclined chute, the intermittent reciprocating diaphragm described, provided with a device for removing from that portion of the inclined chute or raceway inclosed by the hopper or chamber all tacks which do not fall point downward into the chute, substantially as described.

3. In a machine for feeding and driving tacks, the combination of a revolving feed, for receiving tacks one by one from an inclined chute or raceway, and for delivering them successively into the inclined guide $e$, with said inclined guide opening into a chamber, $e^1$, whereby tacks are automatically presented to the driving mechanism, substantially as described.

4. In a machine for feeding and driving loose tacks, the combination of a hopper or cylinder provided with a vertically-reciprocating diaphragm, for depositing tacks uniformly in a raceway or chute, an inclined raceway or chute leading from near the center of said cylinder or hopper to a revolving feeding device, a revolving feeding device for receiving said tacks from the raceway one by one, and for successively delivering said tacks to a short inclined chute or guide opening into a chamber below the driver, provided with means for supporting each tack until the driver is operated, and suitable driving mechanism, all arranged, combined, and operated substantially as described.

5. In a tacking-machine, the combination of the forked support $e$, converging side springs, $e^3$, and the lower support, $e^6$, whereby a tack is centered as it is driven, substantially as described.

6. In a machine for receiving and driving tacks, a clearing device, $f'$, intermittingly reciprocated in the upper part of an inclined chute or raceway, in freeing the same from tacks which have become lodged, substantially as and for the purpose described.

7. In a machine for feeding and driving loose tacks, the combination of the ratchet $c^2$, pawl $c^3$, sliding bar $c^4$, spring $c^9$, and operating-bar $c^7$, all arranged to operate substantially as described.

8. The combination of the sliding bar $c^4$, provided with the adjustable block $c^{15}$, with the actuating-rod $c^7$, provided with an incline, $c^8$, whereby the throw of the pawl is regulated, substantially as described.

9. In a machine for driving loose tacks, an index provided with the groove $c$ and the notches $c^1$, substantially as and for the purposes described.

JAS. W. CARVER.

Witnesses:
F. F. RAYMOND, 2d,
GEO. F. WALKER.